US010162815B2

(12) United States Patent
Lehman et al.

(10) Patent No.: US 10,162,815 B2
(45) Date of Patent: Dec. 25, 2018

(54) DIALOG KNOWLEDGE ACQUISITION SYSTEM AND METHOD

(71) Applicant: Disney Enterprises, Inc., Burbank, CA (US)

(72) Inventors: Jill Fain Lehman, Pittsburgh, PA (US); Boyang Albert Li, Wexford, PA (US); Andre Tiago Abelho Pereira, Pittsburgh, PA (US); Iolanda M. Dos Santos Caravalho Leite, Pittsburgh, PA (US); Ming Sun, Pittsburgh, PA (US); Eli Pincus, New York, NY (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 15/397,659

(22) Filed: Jan. 3, 2017

(65) Prior Publication Data
US 2018/0068658 A1 Mar. 8, 2018

Related U.S. Application Data

(60) Provisional application No. 62/383,193, filed on Sep. 2, 2016.

(51) Int. Cl.
*G06F 9/00* (2006.01)
*H04M 3/00* (2006.01)
(Continued)

(52) U.S. Cl.
CPC .............. *G06F 17/279* (2013.01); *G06F 9/00* (2013.01); *G06F 21/00* (2013.01); *G10L 15/00* (2013.01); *H04M 3/00* (2013.01)

(58) Field of Classification Search
CPC ...................................... G10L 15/22
See application file for complete search history.

(56) References Cited

U.S. PATENT DOCUMENTS

2005/0055321 A1* 3/2005 Fratkina ............ G06F 17/30654
706/45
2005/0080629 A1* 4/2005 Attwater ................. G10L 15/22
704/275

(Continued)

OTHER PUBLICATIONS

Orkin, Jeff, and Roy, Deb. "Automatic Learning and Generation of Social Behavior from Collective Human Gameplay." *Proceedings of The 8th International Conference on Autonomous Agents and Multiagent Systems—vol. 1*. International Foundation for Autonomous Agents and Multiagent Systems, 2009. pp. 385-392.

(Continued)

*Primary Examiner* — Fariba Sirjani
(74) *Attorney, Agent, or Firm* — Farjami & Farjami LLP

(57) ABSTRACT

A dialog knowledge acquisition system includes a hardware processor, a memory, and hardware processor controlled input and output modules. The memory stores a dialog manager configured to instantiate a persistent interactive personality (PIP), and a dialog graph having linked dialog state nodes. The dialog manager receives dialog initiation data, identifies a first state node on the dialog graph corresponding to the dialog initiation data, determines a dialog interaction by the PIP based on the dialog initiation data and the first state node, and renders the dialog interaction. The dialog manager also receives feedback data corresponding to the dialog interaction, identifies a second state node based on the dialog initiation data, the dialog interaction, and the feedback data, and utilizes the dialog initiation data, the first state node, the dialog interaction, the feedback data, and the second state node to train the dialog graph.

20 Claims, 6 Drawing Sheets

(51) Int. Cl.
*G06F 17/27* (2006.01)
*G06F 21/00* (2013.01)
*G10L 15/00* (2013.01)

(56) References Cited

U.S. PATENT DOCUMENTS

| | | | | |
|---|---|---|---|---|
| 2008/0034032 A1* | 2/2008 | Healey | ............... | G06F 8/00 |
| | | | | 709/203 |
| 2009/0082037 A1* | 3/2009 | Ju | ............... | G01C 21/3608 |
| | | | | 455/456.3 |
| 2013/0083063 A1* | 4/2013 | Geisner | ............ | G06F 3/011 |
| | | | | 345/633 |
| 2015/0179170 A1* | 6/2015 | Sarikaya | ......... | G10L 15/22 |
| | | | | 704/275 |

OTHER PUBLICATIONS

Walter S. Lasecki, et al. "Chorus: a Crowd-powered Conversational Assistant." *Proceedings of the 26th annual ACM Symposium on User Interlace Software and Technology*, Oct. 2013, St. Andrews, Scotland, United Kingdom. pp. 1-12.

M. Mitchell, et al. "Crowdsourcing Language Generation Templates for Dialogue Systems." *Proceedings of the Special Interest Group on Discourse and Dialogue (SIGDIAL)*, 2014, pp. 1-9.

\* cited by examiner

DIALOG KNOWLEDGE ACQUISITION SYSTEM AND METHOD

RELATED APPLICATION(S)

The present application claims the benefit of and priority to a Provisional Patent Application Ser. No. 62/383,193, filed Sep. 2, 2016, and titled "Semi-situated Learning of Verbal and Nonverbal Content in an Autonomous Agent," which is hereby incorporated fully by reference into the present application.

BACKGROUND

One of the characteristic features of human interaction is variety of expression. For example, even when two people interact repeatedly in a similar manner, such as greeting one another, many different expressions may be used despite the fact that a simple "hello" would suffice in almost every instance. Instead, human beings in interaction are likely to substitute "good morning", "good evening", "hi", "yo", or a non-verbal expression, such as a nod, for "hello", depending on the context and the circumstances surrounding the interaction. In order for a non-human social agent, such as one embodied in an animated character or robot for example, to engage in an extended interaction with a user, it is desirable that the non-human social agent also be capable of varying its form of expression in a seemingly natural way.

SUMMARY

There are provided dialog knowledge acquisition systems and methods, substantially as shown in and/or described in connection with at least one of the figures, and as set forth more completely in the claims.

DETAILED DESCRIPTION

Figure 1:
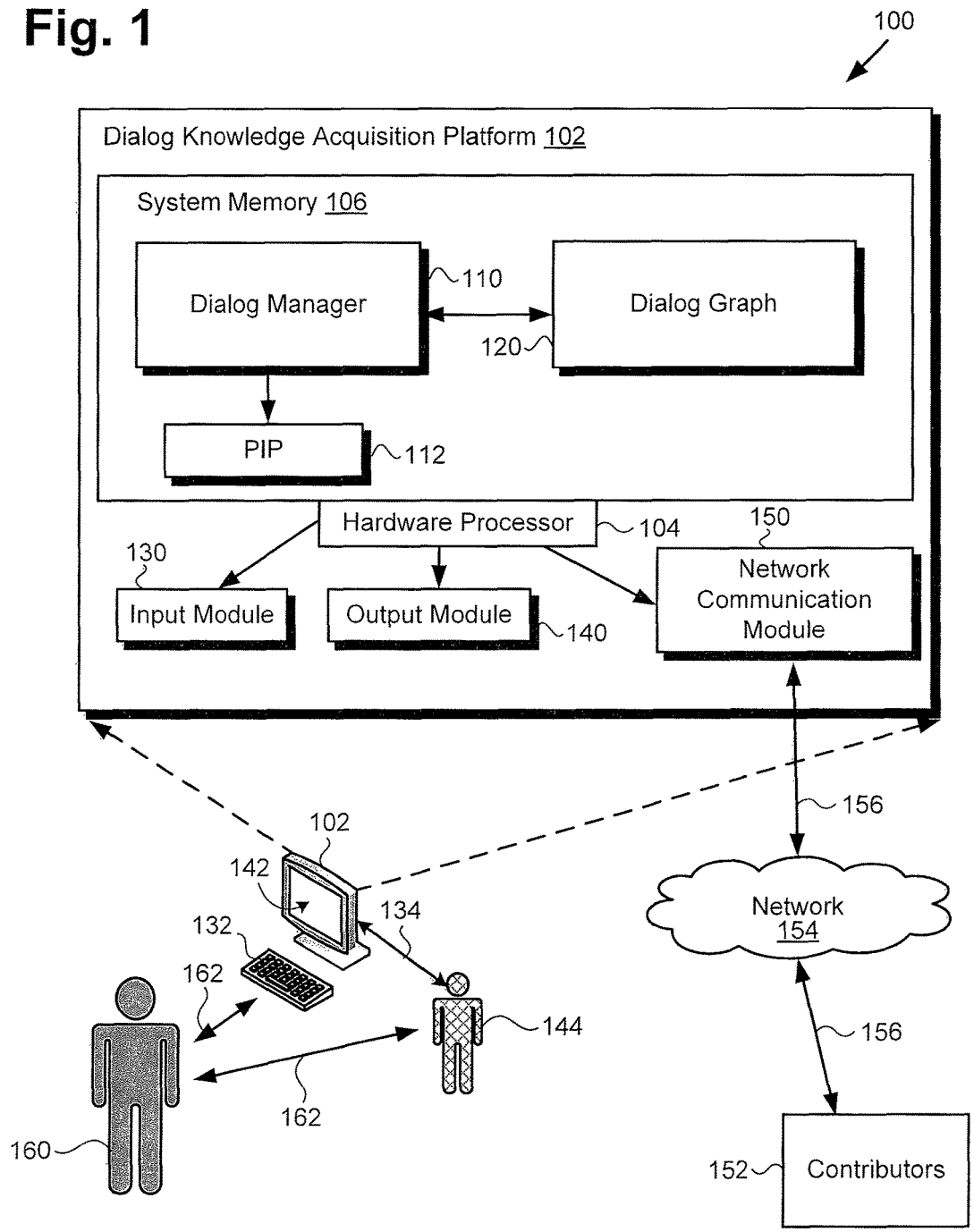
FIG. 1 shows a diagram of a dialog knowledge acquisition system, according to one exemplary implementation.

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals.

One of the characteristic features of human interaction is variety of expression. For example, even when two people interact repeatedly in a similar manner, such as greeting one another, many different expressions may be used despite the fact that a simple "hello" would suffice in almost every instance. Instead, human beings in interaction are likely to substitute "good morning", "good evening", "hi", "yo", or a non-verbal expression, such as a nod, for "hello", depending on the context and the circumstances surrounding the interaction.

Language based robotic or animated characters designed to engage in an ongoing interaction with a user should also have different ways of expressing the same ideas, or even the most potentially compelling interaction will become stale. However, the burden associated with conventional approaches to content authoring for a social agent embodied by such an animated character or robot has presented a longstanding barrier to extended verbal interactions.

The present application is directed to dialog knowledge acquisition systems and methods for instantiating a persistent interactive personality (PIP), that autonomously acquire and consolidate dialog knowledge so as to enable the PIP to engage in extended social interaction. It is noted that, as used herein, the term "persistent," as used to characterize an interactive personality as a PIP, refers to the retention of data describing dialog interactions by the interactive personality for the purpose of acquiring dialog knowledge. However, it is further noted that the data describing dialog interactions retained by the dialog knowledge acquisition system is exclusive of personally identifiable information (PII) of users with whom the PIP interacts. Thus, although the PIP is typically able to distinguish an anonymous user with whom a previous dialog interaction has occurred from anonymous users having no previous dialog interaction experience with the PIP, the dialog knowledge acquisition system is not configured to retain information describing the age, gender, race, ethnicity, or any other PII of any user with whom the PIP interacts.

The dialog knowledge acquisition system includes a system memory storing a dialog manager designed to acquire and consolidate dialog knowledge using multiple modes. For example, the dialog manager can be executed by a hardware processor of the dialog knowledge acquisition system to acquire dialog knowledge using fully-situated or semi-situated learning modes.

In a fully-situated learning mode, the dialog manager instantiates the PIP and utilizes substantially all contextual cues surrounding a language-based interaction to identify appropriate greetings or responses by navigating between state nodes on a dialog graph. For instance, the dialog manager may utilize dialog initiation data including the date, time, and environmental conditions surrounding an interaction. In addition, the dialog initiation data utilized by the dialog manager may include a unique identifier associated with the user with whom the PIP is interacting. For example, such a unique identifier may take the form of a radio-frequency identification (RFID) tag or other uniquely identifiable token assigned to the user and enabling the PIP to "recognize" the user without utilizing PII of the user. Furthermore, the dialog initiation data utilized by the dialog manager may include any previous interaction history with the user, or interaction history with other users at a similar or substantially the same time of day, or under similar or substantially the same environmental conditions.

The dialog manager may be executed by the system hardware processor to identify a first state node on the dialog graph corresponding to the dialog initiation data, and to render a dialog interaction based on the dialog initiation data and the state node. The dialog manager may then use feedback from the user to make decisions regarding subsequent dialog interactions with the user, as well as to train the dialog graph.

For example, positive feedback corresponding to effective communication can cause the dialog manager to strengthen the correspondence between the dialog initiation data and the first state node identified by the dialog manager. Moreover, positive feedback corresponding to effective communication with the user can cause the dialog manager to continue the interaction with the user while remaining in fully-situated learning mode.

By contrast, negative feedback corresponding to a communication failure can cause the dialog manager to cancel or otherwise modify the correspondence between the dialog initiation data and the first state node. In addition, in some implementations, negative feedback corresponding to a communication failure can cause the dialog manager to transition to a semi-situated learning mode.

In a semi-situated learning mode, the dialog manager can be executed by the system hardware processor to generate dialog knowledge off-line by systematically exploring goal-state descriptions of situations that the PIP may encounter, recasting those descriptions into a narrative format that is easy for dialog contributors to understand, and crowdsourcing the production of a meaningful dialog line at the end of each narrative.

That is to say, in semi-situated learning mode, the dialog manager generates a narrative corresponding to at least the dialog initiation data, and then solicits recommendations for further interaction from dialog contributors via a communication network. The dialog manager may then filter the recommendations received from the dialog contributors, may adopt one or more of the recommended interactions, and may train the dialog graph to include the adopted interaction or interactions.

In both fully-situated and semi-situated learning modes, the dialog manager utilizes the dialog graph, which may include multiple hand-authored interaction templates, each providing at least some of the state nodes of the dialog graph. It is noted that although creating the interaction templates constitutes a type of content authoring, it is a substantially less burdensome process than conventional approaches that involve authoring large amounts of dialog. Moreover, the interaction templates are produced once because each interaction template can be used repeatedly to acquire additional dialog knowledge.

In one implementation, the process of dialog knowledge acquisition performed by the dialog manager can become substantially fully autonomous once the dialog graph and its associated interaction templates have been authored. That is to say, once the dialog graph and its associated interaction templates have been authored, the dialog manager can guide the acquisition of additional dialog knowledge without external prompting, by soliciting dialog recommendations and/or editing inputs from third party dialog contributors.

FIG. 1 shows a diagram of an exemplary dialog knowledge acquisition system for implementing the inventive concepts described herein. Dialog knowledge acquisition system 100 includes dialog knowledge acquisition platform 102, which itself includes hardware processor 104, system memory 106, input module 130 including keyboard 132, output module 140 including display 142, and network communication module 150. As shown in FIG. 1, input module 130, output module 140, and network communication module 150 are controlled by hardware processor 104. As further shown in FIG. 1, system memory 106 stores dialog manager 110, dialog graph 120, and may include PIP 112 instantiated by dialog manager 110 when executed by hardware processor 104.

Moreover, and as also shown in FIG. 1, in some implementations, dialog knowledge acquisition system 100 may include PIP embodiment 144, for example, and may be interactively coupled to dialog acquisition platform 102 via wired or wireless communication link 134. User 160 is engaged in interaction 162 with PIP 112 via dialog knowledge acquisition system 100, and dialog contributors 152 in communication with dialog knowledge acquisition platform 102, via communication network 154 and network communication links 156. Although FIG. 1 shows user 160 as a single user, that representation is provided merely for conceptual clarity. More generally, user 160 may correspond to multiple users concurrently interacting with PIP 112 via dialog knowledge acquisition system 100.

It is noted that although FIG. 1 depicts PIP 112 as being instantiated within system memory 106, in some implementations, PIP 112 may be represented by PIP embodiment 144 and may imbue PIP embodiment 144 with social agency, i.e., the ability to interact in a seemingly natural way with user 160 through use of language based and/or non-verbal communications included in interaction 162. Examples of PIP embodiment 144 may include an avatar, a robot, an automated voice response (AVR) system, or an interactive voice response (IVR) system, for example.

It is further noted that although FIG. 1 shows input module 130 as including keyboard 132, output module 140 as including display 142, and both input module 130 and output module 140 as residing on dialog acquisition platform 102, those representations are merely exemplary. In other implementations including an all-audio interface, for example, input module 130 may be implemented as a microphone, while output module 140 may take the form of a speaker. Moreover, in various implementations, input module 130 and/or output module 140 may be integrated with PIP embodiment 144. In other words, in some implementations, PIP embodiment 144 may include input module 130 and/or output module 140.

It is further noted that although dialog acquisition platform 102 is shown as a personal computer (PC) in FIG. 1, that representation is also provided merely as an example. In other implementations, dialog acquisition platform 102 may be implemented as a network server, or may take the form of another type of personal communication device, such as a smartphone or tablet computer, for example. Furthermore, although FIG. 1 depicts display 142 of dialog acquisition platform 102 as being a feature of output module 140, in some implementations, display 142 may be a touchscreen display and may be a feature of dialog acquisition platform 102 shared by both input module 130 and output module 140.

Figure 2A:
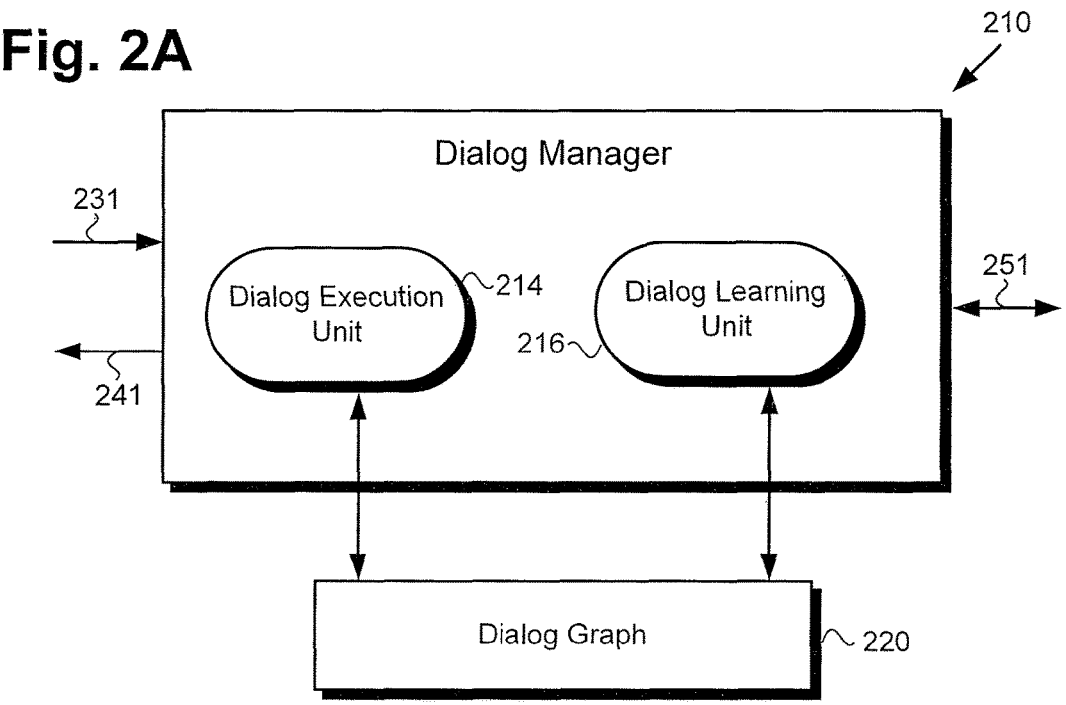
FIG. 2A shows a more detailed diagram of a dialog manager suitable for use in a dialog knowledge acquisition system, according to one implementation.

FIG. 2A shows a more detailed diagram of dialog manager 210 suitable for use in dialog knowledge acquisition system 100, in FIG. 1, according to one implementation. As shown in FIG. 2A, dialog manager 210 includes dialog execution unit 214 and dialog learning unit 216. As further shown in FIG. 2A, dialog manager is configured to receive inputs 231 from input module 130 in FIG. 1, to provide outputs 241 for rendering an interaction to output module 140 in FIG. 1, and to engage in communications 251 via network communication module 150 with dialog contributors 152 in FIG. 1. In addition, FIG. 2A shows dialog execution unit 214 and dialog learning unit 216 of dialog manager 210 to be interactively linked to dialog graph 220.

Dialog manager 210 including dialog execution unit 214 and dialog learning unit 216 corresponds in general to dialog manager 110, in FIG. 1, and those two corresponding features may share any of the characteristics attributed to either feature in the present application. Moreover, dialog graph 220, in FIG. 2, corresponds in general to dialog graph 120, in FIG. 1, and those corresponding features may share any of the characteristics attributed to either feature in the present application.

Dialog manager 110/210 implements dialog acquisition policies and utilizes dialog execution unit 214 and dialog learning unit 216 to grow and evolve, i.e., train, dialog graph 120/220, which is the main data structure for capturing the dialog knowledge and interaction history used to instantiate PIP 112. For example, dialog execution unit 214 follows a dialog continuation policy to extract an appropriate dialog interaction from dialog graph 120/220 in response to inputs received from user 160. In addition, dialog execution unit 214 causes each dialog interaction that occurs to be stored in system memory 106, so that any past dialog interaction can be used as a model for a subsequent dialog interaction.

Dialog learning unit 216 follows a dialog learning policy to train dialog graph 120/220 by mining and prioritizing dialog knowledge acquired through use of dialog execution unit 214 in fully-situated learning mode. In addition, dialog learning unit 216 can be utilized to generate the narratives used to solicit dialog interaction recommendations from dialog contributors 152 in semi-situated learning mode.

Figure 2B:
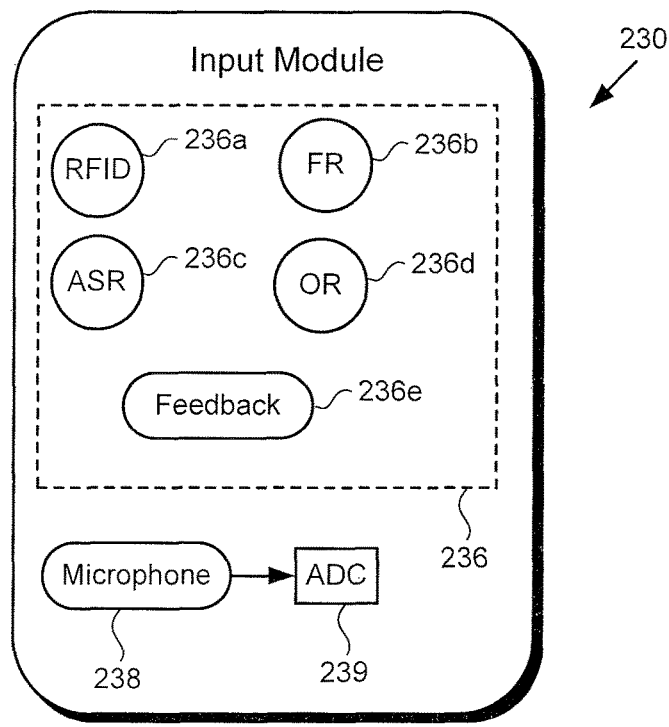
FIG. 2B shows a more detailed diagram of an input module suitable for use in a dialog knowledge acquisition system, according to one implementation.

FIG. 2B shows a more detailed diagram of input module 230 suitable for use in dialog knowledge acquisition system 100, in FIG. 1, according to one implementation. As shown in FIG. 2B, input module 230 includes multiple sensors 236, microphone 238, and analog-to-digital converter (ADC) 239. As further shown in FIG. 2B, sensors 236 of input module 230 may include RFID sensor 236a, facial recognition (FR) sensor 236b, automatic speech recognition (ASR) sensor 236c, object recognition (OR) sensor 236d, and user feedback sensor 236e. Input module 230 corresponds in general to input module 130, in FIG. 1, and those corresponding features may share any of the characteristics attributed to either feature in the present application.

It is noted that the specific sensors shown to be included among sensors 236 of input module 130/230 are merely exemplary, and in other implementations, sensors 236 of input module 130/230 may include more, or fewer, sensors than RFID sensor 236a, FR sensor 236b, ASR sensor 236c, OR sensor 236d, and user feedback sensor 236e. Moreover, in other implementations, sensors 236 may include a sensor or sensors other than one or more of RFID sensor 236a, FR sensor 236b, ASR sensor 236c, OR sensor 236d, and user feedback sensor 236e. It is further noted that in some implementations, input module 130/230 may be configured to receive manual inputs from user 160 via a computer mouse or track pad, keyboard 132, or a touch screen display corresponding to display 142.

Figure 3:
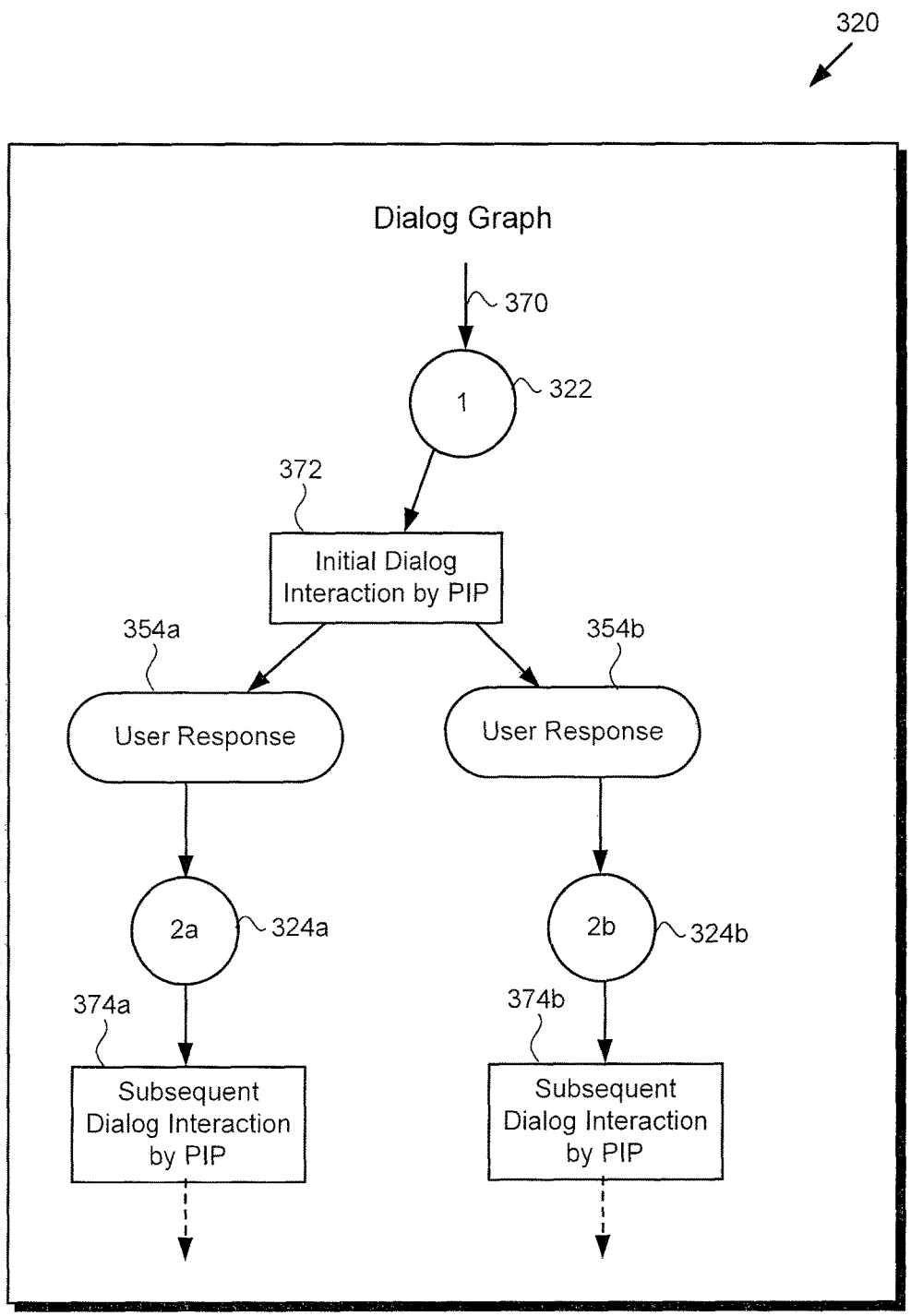
FIG. 3 shows a portion of an exemplary dialog graph utilized in a dialog knowledge acquisition system, according to one implementation.

FIG. 3 shows a portion of exemplary dialog graph 320 utilized in a dialog knowledge acquisition system, according to one implementation. As shown in FIG. 3, dialog graph 320 includes first state node 322 and dialog interaction 372 by PIP 112 with user 160, as well as user response 354a and user response 354b corresponding to alternative possibilities for feedback from user 160 in response to dialog interaction 372. In addition, dialog graph 320 includes alternative second state nodes 324a and 324b, and alternative subsequent dialog interactions 374a and 374b by PIP 112 with user 160.

Also shown in FIG. 3 is dialog initiation data 370 used by dialog execution unit 214 of dialog manager 110/210 to identify first state node 322. Dialog graph 320 corresponds in general to dialog graph 120/220, in FIG. 1/2, and each of those corresponding features may share any of the characteristics attributed to any one of those corresponding features in the present application.

Dialog graph 120/220/320 includes multiple state nodes 322, 324a, and 324b, for example, as well as directed edges providing links among the state nodes and indicating the time order of linked dialog interactions and user feedback. Based on any state node, dialog manager 110/210 can render the meaning of that state node via a combination of natural language and non-verbal behaviors. Based on any input from user 160, such as an input corresponding to dialog initiation data 370, dialog manager 110/210 can utilize dialog execution unit 214 to identify a corresponding state node, e.g., first state node 322, with or without constraints.

As a result, dialog manager 110/210 can utilize dialog execution unit 214 to conduct a conversation by traversing dialog graph 120/220/320. In other words, dialog manager 110/210 can utilize dialog execution unit 214 to map dialog initiation data 370 to first state node 322, and determine a dialog interaction 372 by PIP 112 with user 160 based on dialog initiation data 370 and first state node 322.

Thus, a dialog execution policy implemented by dialog manager 110/210 determines how to map dialog initiation data 370 to first state node 322, as well as how to proceed from first state node 322. For example, a strict policy may use a depth-first traversal of dialog graph 120/220/320 as a conversation between user 160 and PIP 112 evolves. That is to say, under a strict policy, an input from user 160, such as user response 354a or user response 354b, may only be mapped to semantically equivalent children of first state node 322, e.g., alternative second state nodes 324a and 324b. Moreover, under a strict policy, alternative subsequent dialog interactions 374a and 374b by PIP 112 can only be selected from children of semantically equivalent alternative second state nodes 324a and 324b.

It is noted that a strict dialog execution policy may work well if a similar conversation has been previously observed and used to train dialog graph 120/220/320 in a linear fashion. However, such a strict dialog execution policy can lead to failure by dialog execution unit 214 to determine a dialog interaction for PIP 112 due to variations between the present conversation and the previous conversations used to train dialog graph 120/220/320.

By contrast, a relaxed dialog execution policy permits dialog manager 110/210 to utilize dialog execution unit 214 to map inputs from user 160 to state nodes outside the children of any presently occupied state node. Such a relaxed dialog execution policy will substantially always determine a dialog interaction for PIP 112, but that dialog interaction may not always be appropriate to the conversation between PIP 112 and user 160. Consequently, in some implementations, dialog manager 110/210 may utilize a hybrid policy by having dialog execution unit 214 initiate a conversation with user 160 that is governed by a strict dialog execution policy, and having dialog execution unit 214 transition to a relaxed dialog execution policy if and when the strict dialog execution policy fails.

The features shown in FIGS. 1, 2A, 2B, and 3 of the present application will be further described by reference to FIG. 4, which presents flowchart 400 outlining an exemplary method for acquiring dialog knowledge, according to one implementation. With respect to the method outlined in FIG. 4, it is noted that certain details and features have been left out of flowchart 400 in order not to obscure the discussion of the inventive features in the present application.

Figure 4:
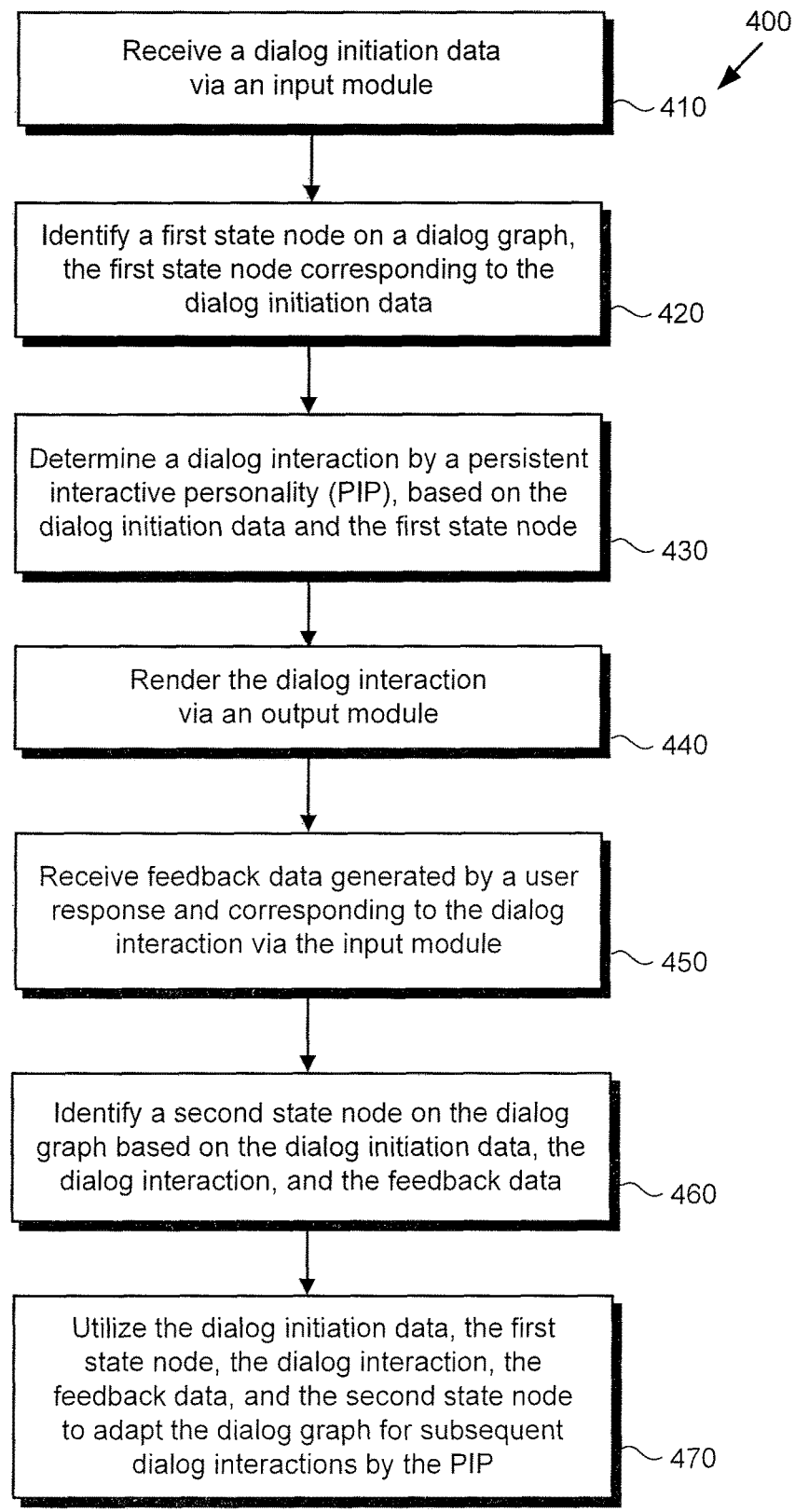
FIG. 4 shows a flowchart presenting an exemplary method for acquiring dialog knowledge, according to one implementation.

Referring to FIG. 4 in combination with FIGS. 1, 2A, 2B, and 3, flowchart 400 begins with receiving dialog initiation data 370 via input module 130/230 (action 410). Dialog initiation data 370 may be received via input module 130/230 by dialog manager 110/210 of dialog knowledge acquisition system 100, executed by hardware processor 104, and using dialog execution unit 214.

In some implementations, input module 130/230 may include keyboard 132 or a touchscreen display corresponding to display 142. In those implementations, dialog initiation data 370 may be received as an input to keyboard 132 or display 142. In some implementations, input module 130/230 may include one or more sensors 236, such as RFID sensor 236a, FR sensor 236b, ASR sensor 236c, OR sensor 236d, and/or user feedback sensor 236e. In implementations including one or more sensors 236, dialog initiation data 370 may be received as sensor data produced by one or more of sensors 236. In addition, or alternatively, in some implementations input module 130/230 may include microphone 238 and ADC 239. In those latter implementations, dialog initiation data 370 may be converted by ADC 239 from speech of user 160 received by microphone 238.

Flowchart 400 continues with identifying first state node 322 on dialog graph 120/220/320 corresponding to dialog initiation data 370 (action 420). Identification of first state node 322 corresponding to dialog initiation data 370 may be performed by dialog manager 110/210 of dialog knowledge acquisition system 100, executed by hardware processor 104, and using dialog execution unit 214.

As a specific example, in a use case in which PIP 112 has previously engaged user 160 in conversation, dialog execution unit 214 may identify first state node 322 as a dialog graph node corresponding to context data mined from the previous conversation between PIP 112 and user 160. As a result, dialog execution unit 214 may make preliminary determinations regarding user 160 based on data retained from previous dialog interactions, such as the day of the week, time of day, weather conditions, or other contextual cues, for example, in addition to a unique identifier, such as an RFID tag, enabling PIP 112 to distinguish user 160 from other users. In other words, PIP 112 may, in effect, be able to "recognize" user 160 as distinguishable from other users, while the real-world identity or other PII of user 160 nevertheless remains unknown to PIP 112.

Flowchart 400 continues with determining dialog interaction 372 by PIP 112 based on dialog initiation data 370 and first state node 322 (action 430). Determination of dialog interaction 372 by PIP 112 based on dialog initiation data 370 and first state node 322 may be performed by dialog manager 110/210 of dialog knowledge acquisition system 100, executed by hardware processor 104, and using dialog execution unit 214. Continuing with the exemplary implementation in which PIP 112 distinguishes user 160 as unique, determination of dialog interaction 372 may result in determining that PIP 112 should greet user 160.

Flowchart 400 continues with rendering dialog interaction 372 via output module 140 (action 440). Dialog interaction 372 may be rendered via output module 140 by dialog manager 110/210 of dialog knowledge acquisition system 100, executed by hardware processor 104, and using dialog execution unit 214.

In some implementations, as represented in FIG. 3, dialog interaction 372 may take the form of a language based communication by PIP 112, such as the greeting: "Hello user 160." Moreover, in some implementations, output module 140 may include display 142. In those implementations, dialog interaction 372 may be rendered as text on display 142.

However, in other implementations dialog interaction 372 may include a non-verbal communication by PIP 112, either instead of, or in addition to a language based communication. For example, in some implementations, output module 140 may include an audio output device, as well as display 142 showing an avatar or animated character as a representation of PIP 112. In those implementations, dialog interaction 372 may be rendered as one or more of speech by the avatar or animated character, a facial expression by the avatar or animated character, and a gesture by the avatar or animated character.

Furthermore, and as shown in FIG. 1, in some implementations, dialog knowledge acquisition system 100 may include PIP embodiment 144 including output module 140. In those implementations, dialog interaction 372 may be rendered as one or more of speech by PIP embodiment 144, a facial expression by PIP embodiment 144, and a gesture by PIP embodiment 144.

Flowchart 400 continues with receiving feedback data generated by one of user response 354a and user response 354b and corresponding to dialog interaction 372 via input module 130/230 (action 450). The feedback data generated by one of user response 354a and user response 354b may be received via input module 130/230 by dialog manager 110/210 of dialog knowledge acquisition system 100, executed by hardware processor 104, and using dialog execution unit 214.

One of user response 354a and user response 354b may be received as feedback data generated by speech, a gesture, or expression by user 160, or generated via keyboard 132 or a touchscreen display corresponding to display 142. For example, one of user response 354a and user response 354b may be received by microphone 238 as a spoken response by user 160. Alternatively, user 160 may provide one of user response 354a and user response 354b via keyboard 132, display 142, or via a dedicated negative feedback button or other selector included as part of feedback sensor 236e.

Flowchart 400 continues with identifying one of alternative second state nodes 324a or 324b on dialog graph 120/220/320 based on dialog initiation data 370, dialog interaction 372, and the feedback data generated by one of user response 354a and user response 354b (action 460). Identification of one of alternative second state nodes 324a or 324b on dialog graph 120/220/320 based on dialog initiation data 370, dialog interaction 372, and the feedback data generated one of user response 354a and user response 354b may be performed by dialog manager 110/210 of dialog knowledge acquisition system 100, executed by hardware processor 104, and using dialog execution unit 214.

For example, where dialog interaction 372 elicits user response 354a, dialog execution unit 214 may advance the interaction between PIP 112 and user 160 along dialog graph 120/220/320 to second state node 324a. Alternatively, where dialog interaction 372 elicits user response 354b, dialog execution unit 214 may advance the interaction between PIP 112 and user 160 along dialog graph 120/220/320 to second state node 324b.

Flowchart 400 continues with utilizing dialog initiation data 370, first state node 322, dialog interaction 372, the feedback data generated by one of user response 354a and user response 354b, and second state node 324a or 324b to train dialog graph 120/220/320 for one of alternative subsequent dialog interactions 374a or 374b by PIP 112 (action 470). The training of dialog graph 120/220/320 using dialog initiation data 370, first state node 322, dialog interaction 372, the feedback data generated by one of user response 354a and user response 354b, and second state node 324a or 324b may be performed by dialog manager 110/210 of dialog knowledge acquisition system 100, executed by hardware processor 104, and using dialog learning unit 216.

One of the functions of dialog manager 110/210 is sensing of conversational failure by dialog execution unit 214 in order to acquire dialog knowledge and expand dialog graph 120/220/320 using dialog learning unit 216. For example, when implementing a strict dialog execution policy, dialog manager 110/210 may register a dialog failure when one of two events occurs: (1) dialog execution unit 214 cannot map a user input to any child of the present state node, or (2) a continuation of the mapped child cannot be identified. Moreover, dialog manager 110/210 can sense dialog failure via feedback sensor 236e.

Dialog manager 110/210 stores failures in system memory 106 along with the circumstances surrounding the conversation that has failed, i.e., dialog history during the conversation, the day of the week, date, time of day, and environmental conditions. In addition, dialog manager 110/210 may store tentative solutions to the dialog failure in system memory 106. For example, any dialog failure may have two solutions: (1) add the user input as a child at the present location on dialog graph 120/220/320, or (2) map the user input to a state node elsewhere on dialog graph 120/220/320. The first solution may be effective in the long-run, while the second solution may save the present conversation immediately. In some implementations, both solutions and the circumstances surrounding the dialog failure are stored by dialog manager 110/210 in system memory 106.

When dialog manager 110/210 senses a dialog failure by dialog execution unit 214, dialog manager 110/210 utilizes dialog learning unit 216 to train dialog graph 120/220/320. Dialog learning unit 216 may be configured to determine which dialog failures to address first, and may employ crowdsourcing via network communication module 150 to acquire additional dialog graph structure, or to identify a tentative solution as acceptable or unacceptable.

Figure 5:
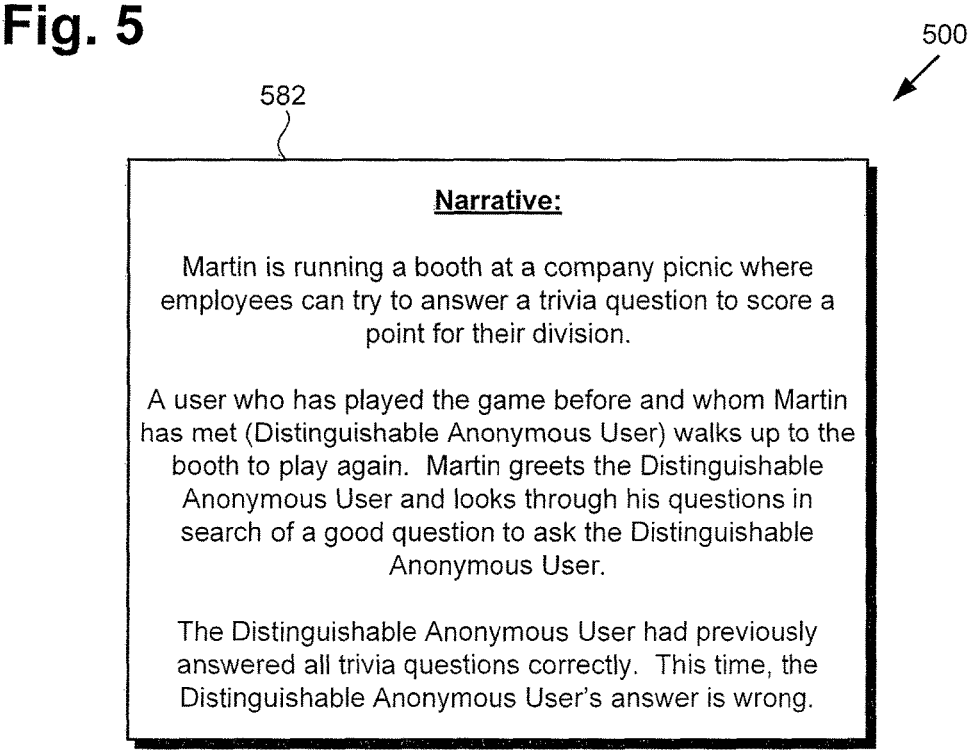
FIG. 5 shows a diagram depicting additional exemplary actions taken by a dialog knowledge acquisition system to acquire dialog knowledge, according to one implementation.

FIG. 5 shows diagram 500 depicting additional exemplary actions taken by dialog manager 110/210 of dialog knowledge acquisition system 100 to acquire dialog knowledge, according to one implementation. Dialog manager 110/210 may utilize dialog learning unit 216 to generate narrative 582 and dialog interaction recommendation request 584. In addition, dialog manager 110/210 may utilize dialog learning unit 216 to filter multiple dialog interaction recommendations 586 received from dialog contributors 152 via communication network 154 and network communication module 150, and to identify one or more adopted dialog interaction(s) 588.

Figure 6:
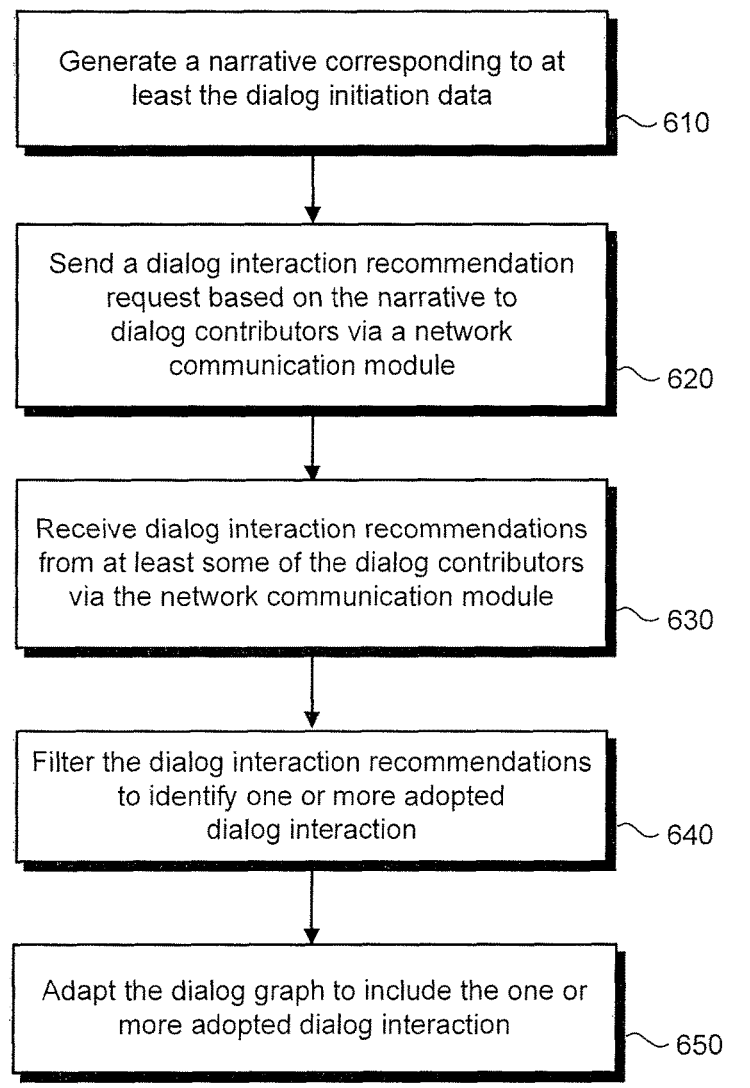
FIG. 6 shows a flowchart describing the additional exemplary actions depicted in FIG. 5.

FIG. 6 shows flowchart 600 describing the additional exemplary actions depicted in FIG. 5 in greater detail. Referring to FIG. 6 in combination with FIGS. 1, 2A, 2B, 3, and 5, flowchart 600 begins with generating narrative 582 corresponding to at least dialog initiation data 370 (action 610). Generation of narrative 582 may be performed by dialog manager 110/210 of dialog knowledge acquisition system 100, executed by hardware processor 104, and using dialog learning unit 216.

Dialog manager 110/210 can utilize a fully-situated learning mode or a semi-situated learning mode when using dialog learning unit 216 to train dialog graph 120/220/320. In a semi-situated learning mode, dialog manager 110/210 can be executed by hardware processor 104 to utilize dialog learning unit 216 to generate dialog knowledge off-line by systematically exploring goal-state descriptions of situations that PIP 112 may encounter, recasting those descriptions into narrative 582 that is easy for dialog contributors 152 to understand, and crowdsourcing the production of a meaningful dialog line at the end of each narrative. In other words, in semi-situated learning mode, dialog manager 110/210 generates narrative 582 corresponding to at least dialog initiation data 370 for a hypothetical conversation by PIP 112 with user 160.

By contrast, in fully-situated learning mode, dialog manager 110/210 may utilize dialog learning unit 216 to train dialog graph 120/220/320 in response to a dialog failure by dialog execution unit 214. Thus, in fully-situated learning mode use cases, narrative 582 would typically correspond to a present conversation occurring between PIP 112 and user 160, rather than a hypothetical conversation. In those instances, narrative 582 may correspond to the circumstances surrounding a dialog failure by dialog execution unit 214, as well as corresponding to dialog initiation data 370.

Referring to FIG. 5, narrative 582 is an exemplary narrative that may have been generated in either fully-situated learning mode or semi-situated learning mode. Thus, narrative 582 may correspond respectively to either a present conversation between PIP 112, recast as Martin, and user 160 with whom PIP 112 has had a previous dialog interaction, recast as Distinguishable Anonymous User, or to a hypothetical conversation between PIP 112 (Martin) and user 160 (Distinguishable Anonymous User).

Flowchart 600 continues with sending dialog interaction recommendation request 584 based on narrative 582 to dialog contributors 152 via network communication module 150 (action 620). Sending dialog interaction recommendation request 584 based on narrative 582 to dialog contributors 152 may be performed by dialog manager 110/210 of dialog knowledge acquisition system 100, executed by hardware processor 104, and using network communication module 150 controlled by hardware processor 104.

As shown in FIG. 1, dialog manager 110/210 of dialog knowledge acquisition system 100 is in communication with dialog contributors 152 via communication network 154 and network communication links 156, as well as via network communication module 150. Communication network 154 may be a packet network, for example, such as the Internet. Moreover, dialog contributors 152 may correspond to contributors to a crowdsourcing Internet marketplace, such as Amazon Mechanical Turk (Mturk™), for example.

Flowchart 600 continues with receiving multiple dialog interaction recommendations 586 from at least some of dialog contributors 152 via network communication module 150 (action 630). Receiving dialog interaction recommendations 586 from at least some of dialog contributors 152 may be performed by dialog manager 110/210 of dialog knowledge acquisition system 100, executed by hardware processor 104, and using network communication module 150 controlled by hardware processor 104.

As shown in FIG. 5, dialog interaction recommendations 586 may include language based dialog interactions. In addition, and as further shown in FIG. 5, dialog interaction recommendations 586 may include cues corresponding to non-verbal interactions. For example, the cues <surprised>, <smug>, and <sad>, can be used by dialog manager 110/210 to determine an appropriate facial expression or gesture by PIP 112 when delivering one of dialog interaction recommendations 586 while in conversation with user 160.

Flowchart 600 continues with filtering dialog interaction recommendations 586 to identify at least one adopted dialog interaction 588 (action 640). Filtering of dialog interaction recommendations 586 to identify at least dialog interaction 588 may be performed by dialog manager 110/210 of dialog knowledge acquisition system 100, executed by hardware processor 104, and using dialog learning unit 216.

In some implementations, dialog manager 110/210 may further employ crowdsourcing to identify adopted dialog interaction 588. For example, after receiving dialog interaction recommendations 586 from a first group of dialog contributors 152, dialog manager 110/210 may send dialog interaction recommendations 586 to a second group of dialog contributors 152 for scoring.

Once again, such crowdsourcing using dialog contributors 152 may be performed via a crowdsourcing Internet marketplace such as Mturk™. In those implementations, dialog manager 110/210 may identify adopted dialog interaction 588 based on the scoring of dialog interaction recommendations 586 performed by dialog contributors 152, as well as on other predetermined filtering criteria included in a dialog learning policy governing the operation of dialog learning unit 216. For example, such a dialog learning policy may prevent dialog learning unit 216 from identifying a high scoring one or more of dialog interaction recommendations 586 as adopted dialog interaction 588 if those one or more high-scoring dialog interaction recommendations include profanity, or is/are identified as being vulgar or otherwise offensive.

Flowchart 600 can conclude with training dialog graph 120/220/320 to include adopted dialog interaction 588 (action 650). The training of dialog graph 120/220/320 to include adopted dialog interaction 588 may be performed by dialog manager 110/210 of dialog knowledge acquisition system 100, executed by hardware processor 104, and using dialog learning unit 216. It is noted that training of dialog graph 120/220/320 to include adopted dialog interaction 588 amounts to acquisition of the dialog knowledge represented by adopted dialog interaction 588, resulting in growth or expansion of dialog graph 120/220/320.

Thus, the present application discloses dialog knowledge acquisition systems and methods. By autonomously acquiring and consolidation dialog knowledge, the dialog knowledge acquisition solutions disclosed in the present application advantageously enable instantiation of a persistent interactive personality, or PIP, capable of engaging in extended social interactions with one or more users.

Various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. A dialog knowledge acquisition system comprising:
    a hardware processor and a memory;
    an input module and an output module controlled by the hardware processor;
    the memory storing a dialog manager configured to instantiate a persistent interactive personality (PIP) and a dialog graph having a plurality of linked dialog state nodes;
    the hardware processor configured to execute the dialog manager to:
        receive a dialog initiation data via the input module;
        identify a first state node on the dialog graph corresponding to the dialog initiation data;
        determine a dialog interaction by the PIP based on the dialog initiation data and the first state node;
        render the dialog interaction via the output module, wherein the output module renders the dialog interaction as at least one of a speech, a facial expression, and a gesture being performed by one of a robot and an avatar;
        receive a user response corresponding to the dialog interaction via the input module;
        perform a strict dialog execution policy such that the user response is only mapped to semantically equivalent children of the first state node;
        perform a relaxed dialog execution policy such that the user response is mapped to the plurality of linked dialog state nodes outside the children of the first state node, upon registering a dialog failure;
        identify a second state node on the dialog graph based on the dialog initiation data, the dialog interaction, and the user response; and
        utilize the dialog initiation data, the first state node, the dialog interaction, the user response, and the second state node to train the dialog graph for subsequent dialog interactions by the PIP.

2. The dialog knowledge acquisition system of claim 1, wherein the dialog interaction comprises a language based communication by the PIP.

3. The dialog knowledge acquisition system of claim 1, wherein the dialog interaction comprises a non-verbal communication by the PIP.

4. The dialog knowledge acquisition system of claim 1, wherein the input module comprises at least one of a keyboard and a touchscreen display, and wherein the dialog initiation data is received as an input to one of the at least one of the keyboard and the touchscreen display.

5. The dialog knowledge acquisition system of claim 1, wherein the input module comprises at least one sensor, and wherein the dialog initiation data comprises sensor data produced by the at least one sensor.

6. The dialog knowledge acquisition system of claim 1, wherein the input module comprises a microphone and an analog-to-digital converter (ADC), and wherein the dialog initiation data is converted by the ADC from speech received by the microphone.

7. The dialog knowledge acquisition system of claim 1, wherein the output module comprises a display, and wherein the dialog interaction is rendered as text on the display.

8. The dialog knowledge acquisition system of claim 1, wherein the output module comprises an audio output device and a display showing the avatar as a representation of the PIP, and wherein the dialog interaction is rendered as at least one of the speech by the avatar, the facial expression by the avatar, and the gesture by the avatar.

9. The dialog knowledge acquisition system of claim 1, further comprising the robot as a representation of the PIP, wherein the robot includes the output module, and wherein the dialog interaction is rendered as at least one of the speech by the robot, the facial expression by the robot, and the gesture by the robot.

10. The dialog knowledge acquisition system of claim 1, further comprising a network communication module controlled by the hardware processor, wherein the hardware processor is further configured to execute the dialog manager to:
- generate a narrative corresponding to at least the dialog initiation data;
- send a dialog interaction recommendation request based on the narrative to a first plurality of contributors via the network communication module;
- receive a second plurality of dialog interaction recommendations from at least some of the first plurality of contributors via the network communication module;
- filter the second plurality of dialog interaction recommendations to identify at least one adopted dialog interaction; and
- train the dialog graph to include the at least one adopted dialog interaction.

11. A method for use by a dialog knowledge acquisition system including a hardware processor, an input module and an output module controlled by the hardware processor, and a memory storing a dialog manager configured to instantiate a persistent interactive personality (PIP) and a dialog graph having a plurality of linked dialog state nodes, the method comprising:
- receiving, by the dialog manager executed by the hardware processor, a dialog initiation data via the input module;
- identifying, by the dialog manager executed by the hardware processor, a first state node on the dialog graph corresponding to the dialog initiation data;
- determining, by the dialog manager executed by the hardware processor, a dialog interaction by the PIP based on the dialog initiation data and the first state node;
- rendering, by the dialog manager executed by the hardware processor, the dialog interaction via the output module, wherein the output module renders the dialog interaction as at least one of a speech, a facial expression, and a gesture being performed by one of a robot and an avatar;
- receiving, by the dialog manager executed by the hardware processor, a user response corresponding to the dialog interaction via the input module;
- performing, by the dialog manager executed by the hardware processor, a strict dialog execution policy such that the user response is only mapped to semantically equivalent children of the first state node;
- performing, by the dialog manager executed by the hardware processor, a relaxed dialog execution policy such that the user response is mapped to the plurality of linked dialog state nodes outside the children of the first state node, upon registering a dialog failure;
- identifying, by the dialog manager executed by the hardware processor, a second state node on the dialog graph based on the dialog initiation data, the dialog interaction, and the user response; and
- utilizing, by the dialog manager executed by the hardware processor, the dialog initiation data, the first state node, the dialog interaction, the user response, and the second state node to train the dialog graph for subsequent dialog interactions by the PIP.

12. The method of claim 11, wherein the dialog interaction comprises a language based communication by the PIP.

13. The method of claim 11, wherein the dialog interaction comprises a non-verbal communication by the PIP.

14. The method of claim 11, wherein the input module comprises at least one of a keyboard and a touchscreen display, and wherein the dialog initiation data is received as an input to one of the at least one of the keyboard and the touchscreen display.

15. The method of claim 11, wherein the input module comprises at least one sensor, and wherein the dialog initiation data comprises sensor data produced by the at least one sensor.

16. The method of claim 11, wherein the input module comprises a microphone and an analog-to-digital converter (ADC), and wherein the dialog initiation data is converted by the ADC from speech received by the microphone.

17. The method of claim 11, wherein the output module comprises a display, and wherein the dialog interaction is rendered as text on the display.

18. The method of claim 11, wherein the output module comprises an audio output device and a display showing the avatar as a representation of the PIP, and wherein the dialog interaction is rendered as at least one of the speech by the avatar, the facial expression by the avatar, and the gesture by the avatar.

19. The method of claim 11, wherein the dialog knowledge acquisition system further comprises the robot as a representation of the PIP, wherein the robot includes the output module, and wherein the dialog interaction is rendered as at least one of the speech by the robot, the facial expression by the robot, and the gesture by the robot.

20. The method of claim 11, wherein the dialog knowledge acquisition system further comprises a network communication module controlled by the hardware processor, and wherein the method further comprises:
- generating, by the dialog manager executed by the hardware processor, a narrative corresponding to at least the dialog initiation data;
- sending, by the dialog manager executed by the hardware processor, a dialog interaction recommendation request based on the narrative to a first plurality of contributors via the network communication module;
- receiving, by the dialog manager executed by the hardware processor, a second plurality of dialog interaction recommendations from at least some of the first plurality of contributors via the network communication module;
- filtering, by the dialog manager executed by the hardware processor, the second plurality of dialog interaction recommendations to identify at least one adopted dialog interaction; and
- training, by the dialog manager executed by the hardware processor, the dialog graph to include the at least one adopted dialog interaction.

* * * * *